US007027908B2

(12) United States Patent
Esteghlal

(10) Patent No.: US 7,027,908 B2

(45) Date of Patent: Apr. 11, 2006

(54) METHOD AND DEVICE FOR CONTROLLING AN INTERNAL COMBUSTION ENGINE ON A VEHICLE

(75) Inventor: Gholamabas Esteghlal, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/487,568

(22) PCT Filed: Aug. 8, 2002

(86) PCT No.: PCT/DE02/02922

§ 371 (c)(1), (2), (4) Date: Jul. 27, 2004

(87) PCT Pub. No.: WO03/018985

PCT Pub. Date: Mar. 6, 2003

(65) Prior Publication Data

US 2004/0255903 A1 Dec. 23, 2004

(30) Foreign Application Priority Data

Aug. 24, 2001 (DE) ................................ 101 41 600

(51) Int. Cl.

| | |
|---|---|
| ***F02P 5/15*** | (2006.01) |
| ***G06G 7/70*** | (2006.01) |
| ***G06F 19/00*** | (2006.01) |

(52) U.S. Cl. .................................. 701/110; 123/406.46

(58) Field of Classification Search ................ 123/359, 123/352, 361, 406.45, 406.46, 406.53, 406.54, 123/406.58, 450, 342; 701/103, 110, 111, 701/113, 102

See application file for complete search history.

(56) References Cited

U.S. PATENT DOCUMENTS

| | | | | | |
|---|---|---|---|---|---|
| 4,408,582 | A * | 10/1983 | Merrick | ................. | 123/406.46 |
| 4,425,890 | A * | 1/1984 | Yamaguchi | ............ | 123/406.46 |
| 4,658,787 | A * | 4/1987 | Takizawa | .............. | 123/406.45 |
| 5,692,471 | A * | 12/1997 | Zhang | ........................ | 123/350 |
| 5,947,079 | A * | 9/1999 | Sivashankar et al. | .. | 123/406.45 |
| 6,029,630 | A * | 2/2000 | Toyohara et al. | ...... | 123/406.58 |
| 6,047,681 | A * | 4/2000 | Scherer et al. | ......... | 123/406.46 |
| 6,155,230 | A * | 12/2000 | Iwano et al. | ........... | 123/406.45 |
| 6,505,594 | B1 * | 1/2003 | Katayama et al. | ..... | 123/406.54 |

FOREIGN PATENT DOCUMENTS

| | | | |
|---|---|---|---|
| DE | 19506082 | A1 * | 8/1996 |
| DE | 19517675 | A1 * | 11/1996 |
| DE | 19913272 | A1 * | 9/2000 |
| EP | 1079089 | A2 * | 2/2001 |

* cited by examiner

*Primary Examiner*—Willis R. Wolfe, Jr.

(74) *Attorney, Agent, or Firm*—Kenyon & Kenyon

(57) ABSTRACT

A method and a device for controlling an internal combustion engine of a vehicle, in which a performance quantity of the internal combustion engine or of the vehicle is limited to a predefined limit value. For the limiting, a control of the air supply to the internal combustion engine is permitted first, while a control of the ignition angle is permitted subsequently.

7 Claims, 3 Drawing Sheets

METHOD AND DEVICE FOR CONTROLLING AN INTERNAL COMBUSTION ENGINE ON A VEHICLE

FIELD OF THE INVENTION

The present invention is directed to a method and a device for controlling an internal combustion engine of a motor vehicle.

BACKGROUND INFORMATION

In connection with the control of internal combustion engines, at least one performance quantity is often limited to a predefined maximum value to protect the internal combustion engine or the components, for example, or to restrict the driving performance of the vehicle, among others. Pertinent examples are speed restrictions, torque limitations or driving speed restrictions. As a rule, the intention is to observe the limit value to the greatest possible extent and to comfortably control the performance quantity to the limit value, without overshoots. One such example is a maximum speed limitation of an internal combustion engine from German Patent Application No. 195 06 082 in which, beginning with a starting value below the limit value, the throttle-valve angle is reduced in a step-wise manner in order to avoid a speed overshoot beyond the limit value.

Another realization of a speed limitation is referred to in German Patent Application No. 33 19 025. Here, in response to the limit value being exceeded, the ignition angle is adjusted and/or the air-fuel mixture made leaner by a corresponding adjustment of the injection time in an attempt to restrict the speed to the limit value.

In some applications, when the limiting is realized by controlling the air supply via a throttle valve, for example, this may result in an oscillation tendency because of the dead time of the controlled system and/or due to the sudden torque reduction, in particular while the performance quantity is adjusted to the limit value. When the ignition-angle adjustment is used as the limiting actuating variable, the exhaust gas becomes very hot due to the ignition angle being delayed and may therefore possibly damage the catalytic converter and/or other components in the region of the exhaust-gas tract. Consequently, there is a need to optimize a limiting function.

SUMMARY OF THE INVENTION

The described conflict in the objective is avoided in that, first, for example upon reaching the limit value or upon reaching a value derived therefrom, an intervention in the air supply takes place during which no ignition-angle intervention is allowed. If the performance quantity to be limited approaches the limit value, the ignition-angle intervention is permitted in order to rapidly adjust the operating variable to be limited to the limit value, in an oscillation-free manner. In this way, it is ensured that the exhaust gas no longer becomes so hot due to the reduced operating mode of the ignition-angle range, yet sufficient dynamic response exists nevertheless.

The danger of damage to the catalytic converter and/or other components may be reduced in an especially advantageous manner.

Furthermore, the subsequent ignition-angle intervention allows a soft adjustment to the limit value, so that the driving comfort is not adversely affected by the described procedure. The oscillation tendency attributable to the dead time of the system or to the sudden torque reduction may be considerably reduced.

BRIEF DESCRIPTIONS OF THE DRAWINGS

DETAILED DESCRIPTION

Figure 1:
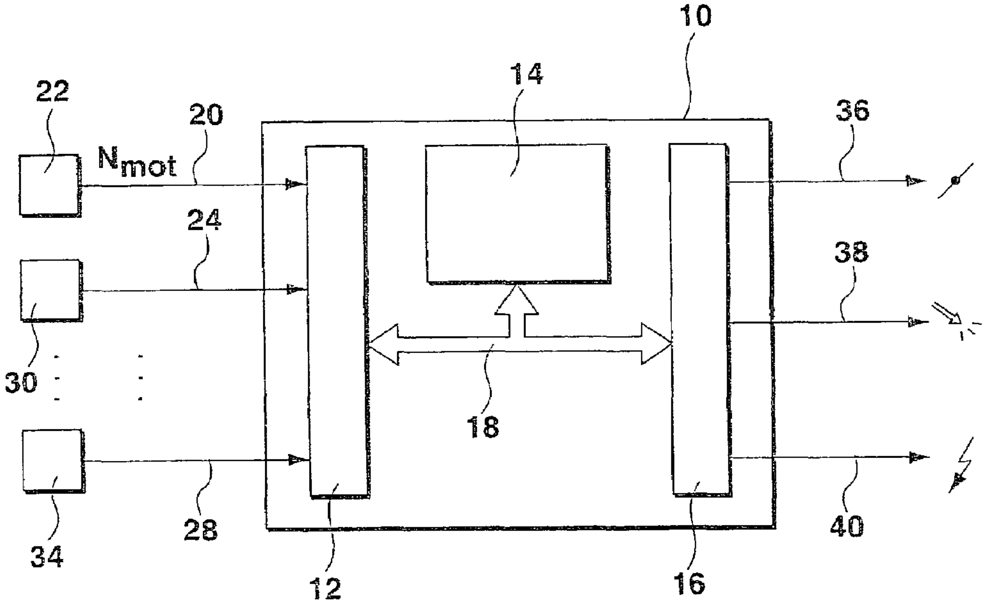
FIG. 1 shows an overall view of a control device for controlling an internal combustion engine.

FIG. 1 shows an overall view of a control device 10, which is made up of input circuit 12, mircrocomputer 14 and output circuit 16. These elements are interconnected via a bus system 18. Control device 10 represents an electronic engine-control device for controlling the internal combustion engine in which the functions known to one skilled in the art from the related art are used for engine control. With respect to the subsequently described procedure for limiting a performance quantity of the internal combustion engine or the vehicle, control device 10, and there, specifically, input circuit 12, is provided with a signal from a measuring device 22 via an input line 20, this signal representing the performance quantity to be limited, which is engine speed nmot in the exemplary embodiment described in the following.

Via additional input lines 24 through 28, additional performance quantities of the internal combustion engine and/or the vehicle are transmitted to control device 10 from measuring devices 30 through 34. These performance quantities are the variables required for the functions implemented by control device 10 in order to control the internal combustion engine, such as accelerator-pedal position, engine temperature, exhaust-gas composition, conveyed air mass, intake-manifold pressure and others.

The actuating variables for setting the power parameters of the internal combustion engine are output by control device 10 via output circuit 16. In the exemplary embodiment of an internal combustion engine, these are primarily the air supply, ignition-angle adjustment and fuel metering. In FIG. 1, this is symbolized by output lines 36, for controlling the air supply, 38, for controlling the fuel metering, and 40, for controlling the ignition angle.

The procedure for limiting a performance quantity of the internal combustion engine and/or of the vehicle, which is described in the following, is implemented in the form of a program in microcomputer 14. This program determines output variables for the control of the internal combustion engine, in the sense of limiting the performance quantity, as a function of the input variables. Such a program for limiting the performance quantity constitutes an independent subject matter of the present invention. In the following, the limiting procedure is illustrated on the basis of a speed limitation. However, the shown procedure is utilized with different performance quantities in other exemplary embodiments, for example in connection with a driving-speed limitation, torque restriction etc. In the process, the same advantages are achieved as in the speed limitation mentioned at the outset.

In addition to the limiting function, the control device also implements the other engine-control functions, likewise with the aid of programs of the microcomputer. For example, the torque of the internal combustion engine is adjusted by adapting the actuating variables as a function of the accelerator-pedal position and other performance quantities.

To limit the rotational speed, the engine speed or a variable derived from the engine speed (a so-called predicted rotational speed, for example) is compared to a maximum rotational speed. The predicted speed is derived from the measured engine speed and its gradient, in such a way that, when the predicted rotational speed exceeds the maximum speed, it may be assumed that the actual rotational speed exceeds the maximum speed in the near future. Thus, if the actual variable to be restricted exceeds a maximum value, an intervention in the air supply is implemented via an amplifier of the restrictor; in particular, the throttle valve is closed. No ignition-angle intervention is permitted during this procedure. If the variable to be restricted (engine speed or predicted rotational speed) reaches the maximum rotational speed or if it exceeds it, injections to individual cylinders are suppressed in one advantageous exemplary embodiment. If the variable that constitutes the control signal for controlling the air supply has become smaller than a predefined threshold value and/or if the difference between limit value and actual rotational speed is within a predefined range, the ignition-angle intervention is enabled and the adjustment of the speed to the limit value is thus realized with high precision and dynamic response, by means of an ignition-angle adjustment. In one exemplary embodiment, it is possible to dispense with the suppression of injections.

Depending on the exemplary embodiment, the maximum speed-limit value is compared to the predicted speed value, or a speed-limit value derived from the maximum-speed limit value is compared to the actual engine speed so as to trigger the afore-described limiting procedure. In both cases, the heating of the exhaust gases and/or oscillations during the adjustment is/are effectively prevented by selection of the procedure.

As mentioned above, in the exemplary embodiment, the limiting function is realized as a program of microcomputer 14. This program is sketched in FIG. 2 with the aid of a flow chart. The individual elements of the flow chart shown in FIG. 2 represent program parts or program steps, while the connecting lines illustrate the flow of information.

Figure 2:
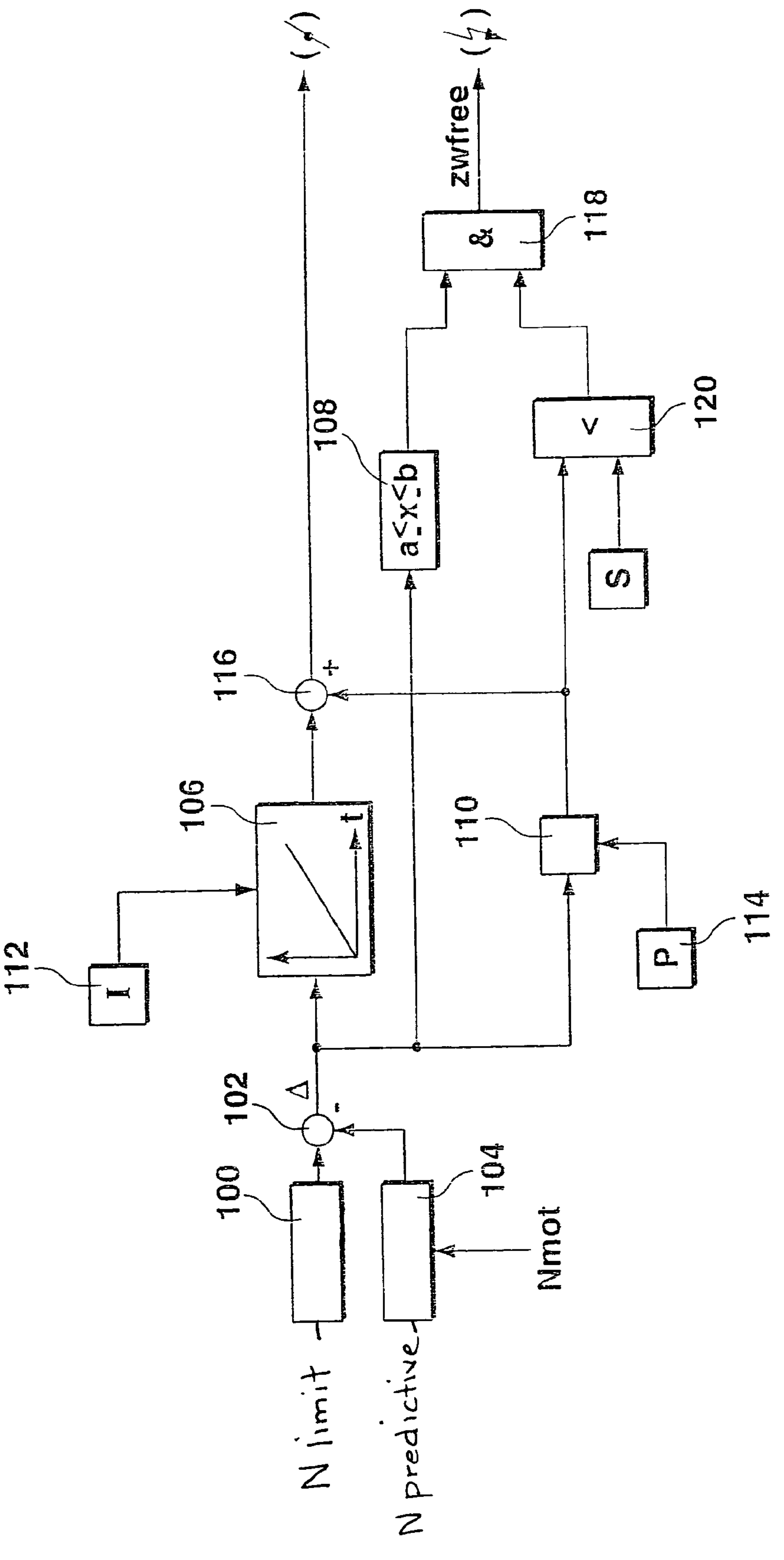
FIG. 2 shows a method flow chart for limiting a selected performance quantity of the internal combustion engine, using the rotational speed as an example.

The representation according to FIG. 2 shows an exemplary embodiment for limiting the engine speed. In other exemplary embodiments, the limiting is used in an analogous manner to limit the torque, the vehicle speed and others.

First, a speed limit value Nlimit, predefined or able to be influenced by the driver, is selected in 100. It is conveyed to a node 102 in which this limit value is compared to a predicted speed value Npred. The predicted speed is determined in 104 as a function of engine speed Nmot. One exemplary embodiment consists of increasing the engine speed by a factor derived from the gradient of the engine speed. Deviation Δ between the limit speed and the predicted speed, determined in 102, is conveyed to an integrator 106, a comparator 108 and an amplifier 110. An integration constant I is supplied from memory 112 to integrator 100. The integration constant is either fixedly predefined or is a function of performance quantities. For instance, it is a function of the speed or the speed deviation, a larger constant being provided as the speed deviation gets smaller or at increasing speed. In 114, proportionality factor P is determined accordingly and supplied to amplifier 110. Here, too, the factor is either fixedly predefined or is a function of performance quantities, for example, a function of speed or the speed deviation.

As a function of speed deviation Δ and the integration constant, the integrator generates an output signal that is conveyed to node 116. Accordingly, amplifier 110 generates an output signal from speed deviation Δ and proportionality constant P, this output signal being conveyed to node 116. Both output signals are linked to each other, in particular, added, and transmitted as output signal for the torque control. Thus, when the predicted speed exceeds limit speed Nlimit, i.e., in a negative deviation value Δ, a reduction in the torque is implemented in 110 as a result of the proportionality amplification, so that the predicted speed may be regulated to the limit speed. Instead of the setpoint value as a function of driver input or instead of other setpoint values, the output signal, generated according to FIG. 2, is retransmitted, preferably within the framework of a minimum-value selection. In this phase of the speed limiting, the ignition-angle intervention is not allowed. The realization of the torque preselected by the output signal thus occurs only via the control of the air supply, possibly the fuel metering, and not via ignition-angle adjustment.

To enable the ignition-angle intervention, via signal zwenable, the speed deviation is compared to limit values a and/or b in comparator 106. If the speed deviation is within a range of predefined values a and b, or below the upper or above the lower limit value in other embodiments, a corresponding signal is transmitted to AND-operation 118. Furthermore, the output signal of proportionality amplifier 110 is compared to a threshold value S in a comparator 120. If the output signal is below this threshold value, i.e., if it is smaller than the threshold value or, in negative values, is larger than it, a corresponding signal is transmitted to the AND-operation. Signal zwenable is generated in this case, thereby releasing the ignition-angle intervention if the speed deviation is within the predefined range and the output signal of the proportionality amplifier is smaller than the preselected threshold value. In other applications, only one of the mentioned criteria is examined to enable the ignition-angle intervention. The other criterion may then be omitted.

The afore-described approach operates on the basis of a comparison of the predicted rotational speed to a limit speed. In other exemplary embodiments, the actually measured engine speed is used instead of the predicted speed, the limit speed not being the actual limit speed but a variable that is derived therefrom and changeable as a function of the speed or the speed gradient, for example, as is the case in the related art mentioned in the introduction, for instance.

Ignition-angle enabling in this context means that the setpoint-torque value, which corresponds to the combined output signal of amplifier 110 and integrator 100, is realized not only via the control of the air supply, possibly the fuel metering, but also via the control of the ignition angle.

Figure 3A:
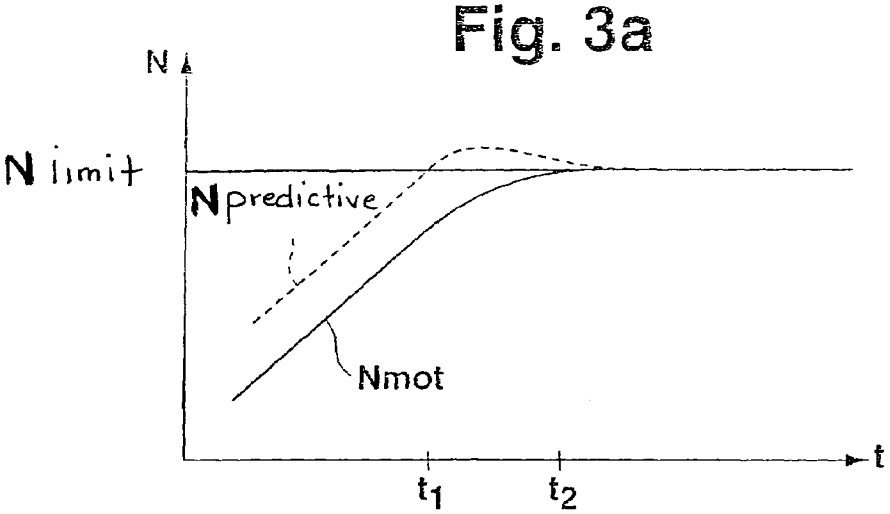
FIG. 3 shows the effect of the limiting on the basis of time diagrams.
Figure 3B:
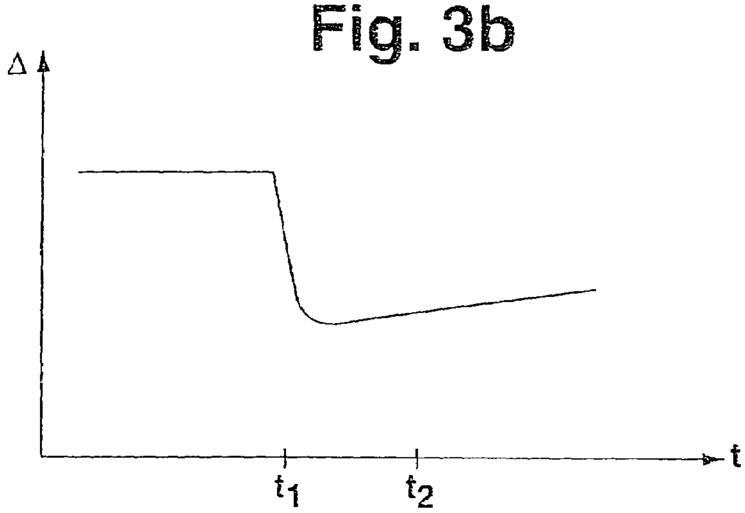
Figure 3C:
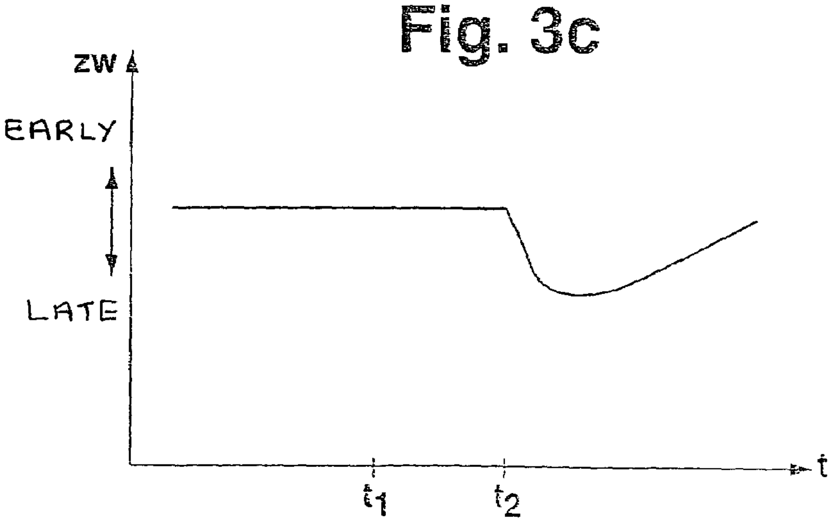

The procedure shown is elucidated more clearly with the aid of the time diagrams of FIG. 3. FIG. 3*a* shows the time characteristic of engine speed Nmot as well as predicted rotational speed Npred; FIG. 3*b* illustrates the characteristic of throttle-valve setting a; and FIG. 3*c* shows the time characteristic of ignition angle ZW.

FIG. 3*a* shows a position of the engine speed rising in the direction of limit value Nlimit. Predicted rotational speed Npred has been indicated by a dotted line, while actual engine speed Nmot is shown as a solid line. The predicted engine speed is derived from the engine speed, taking its gradient into account. At instant t1, predicted rotational speed Npred exceeds limit value Nlimit, i.e., the regulator detects a negative deviation between limit speed and predicted speed. According to FIG. 3*b*, this results in a stepped reduction of throttle-valve setting a, beginning with instant t1. The speed increase is slowed correspondingly, which leads to a greater slow-down in the rise of the predicted speed, due to the decreasing gradient. An adjustment of the ignition angle takes place at instant t1, as indicated in FIG. 3*c*. At instant t2, the deviation between predicted speed Npred and limit speed Nlimit enters the predefined range. Furthermore, according to FIG. 3*b*, at instant t2 the proportional component of the limiting regulator is smaller than the predefined limit value, so that, beginning with instant t2, an enabling of the ignition angle and a correction of the relatively small residual-speed deviation is implemented by retarding the ignition angle as shown in FIG. 3*c*.

As illustrated above, the elucidated procedure is used not only in connection with speed limiting, but also in connection with the limiting of other performance quantities, for example to limit the torque, to limit the driving speed of a vehicle, etc.

The invention claimed is:

1. A device for controlling an internal combustion engine of a vehicle, comprising:

a control unit to detect a measure for a performance quantity, and to compare the performance quantity to a predefined limit value and, as a function of a comparison result, controlling the internal combustion engine to the limit value to limit the performance quantity;

wherein only an air supply to the internal combustion engine is controlled initially and an ignition-angle intervention is subsequently enabled, the enabling of the ignition-angle intervention being implemented when the deviation between the limit value and the performance quantity is limited in its amount to at least one of a maximum and a second control variable for controlling the torque of the internal combustion engine, which is generated with a proportional amplifier as a function of the deviation between the limit value and the performance quantity, is below a predefined threshold value in its amount.

2. A computer program product comprising program code that is stored on a computer-readable data carrier and that is executable on a control device to control an internal combustion engine of a vehicle by performing the following:

detecting a performance quantity;

limiting the performance quantity to a predefined limit value by controlling the air supply to the internal combustion engine by controlling the air supply first and subsequently implementing an ignition-angle intervention; and enabling the ignition-angle intervention when a deviation between the limit value and the performance quantity is limited in its amount to at least one of a maximum and a second control variable for controlling the torque of the internal combustion engine, which is generated with a proportional amplifier as a function of the deviation between the limit value and the performance quantity, is below a predefined threshold value in its amount.

3. A method for controlling an internal combustion engine of a vehicle, the method comprising:

detecting a performance quantity;

limiting the performance quantity to a predefined limit value by controlling the air supply to the internal combustion engine by controlling the air supply first and subsequently implementing an ignition-angle intervention; and enabling the ignition-angle intervention when a deviation between the limit value and the performance quantity is limited in its amount to at least one of a maximum and a second control variable for controlling the torque of the internal combustion engine, which is generated with a proportional amplifier as a function of the deviation between the limit value and the performance quantity, is below a predefined threshold value in its amount.

4. The method of claim 3, wherein a predicted performance quantity is generated as a function of the performance quantity and its gradient, which is compared to the limit value.

5. The method as of claim 3, wherein the performance quantity includes one of the engine speed, a predicted speed, an engine torque and a vehicle speed.

6. The method of claim 3, wherein a first control variable is generated by an integrator as a function of the deviation between the limit value and the performance quantity, and the second control variable is generated by the proportional amplifier, the control variables both forming a resulting control variable for controlling the torque of the internal combustion engine.

7. The method of claim 3, wherein the restrictor determines a setpoint value for a torque of the internal combustion engine and, from this setpoint value and additional setpoint variables for the torque, a resulting setpoint variable is generated to control the internal combustion engine, which is realized by controlling the one of the air supply, and a fuel metering by ignition-angle adjustment.

* * * * *